United States Patent
Lim

(10) Patent No.: US 6,639,646 B2
(45) Date of Patent: Oct. 28, 2003

(54) MANUFACTURING PROCESS OF LIQUID CRYSTAL CELLS FOR SMALL SIZED LIQUID CRYSTAL DISPLAY DEVICES

(75) Inventor: Joo-Soo Lim, Gyeongsangbuk-go (KR)

(73) Assignee: LG. Philips LCD Co., Ltd., Seoul (KR)

( * ) Notice: Subject to any disclaimer, the term of this patent is extended or adjusted under 35 U.S.C. 154(b) by 63 days.

(21) Appl. No.: 09/994,793

(22) Filed: Nov. 28, 2001

(65) Prior Publication Data

US 2002/0063845 A1 May 30, 2002

(30) Foreign Application Priority Data

Nov. 28, 2000  (KR) .................................... 2000-0071353

(51) Int. Cl.[7] ....................... G02F 1/1368; G02F 1/1345
(52) U.S. Cl. .......................... 349/187; 349/139; 349/73
(58) Field of Search .......................... 349/73, 187, 189, 349/190, 139, 152; 324/770; 257/59, 72, 208, 350, 390, 620

(56) References Cited

U.S. PATENT DOCUMENTS 6,172,410 B1 * 1/2001 Nagata et al. .............. 257/620
6,195,149 B1 * 2/2001 Kodera et al. .............. 349/187
6,246,074 B1 * 6/2001 Kim et al. ..................... 257/48
2002/0063843 A1 * 5/2002 Yu et al. ...................... 349/187

\* cited by examiner

*Primary Examiner*—Toan Ton
*Assistant Examiner*—Tai Duong
(74) *Attorney, Agent, or Firm*—Morgan Lewis & Bockius LLP

(57) ABSTRACT

A manufacturing method of liquid crystal cells for a liquid crystal display device includes forming a first plurality of liquid crystal cells on an upper substrate, forming a second plurality of liquid crystal cells on a lower substrate, forming a gate contact pad in a marginal space of the lower substrate, the gate pad connected to a first group of the plurality of gate lines of one of a common row and common column of the second plurality of cells, forming a data contact pad in the marginal space of the lower substrate, the data pad connected to a first group of the plurality of data lines of one of a common row and common column of the second plurality of cells, forming a common voltage contact pad on the lower substrate, forming an assembled substrate by bonding the lower substrate to the upper substrate, separating the assembled substrate into sub-substrates, introducing liquid crystal material into the second plurality of liquid crystal cells of the sub-substrate, and inspecting the second plurality of liquid crystal cells of the sub-substrate.

14 Claims, 5 Drawing Sheets

MANUFACTURING PROCESS OF LIQUID CRYSTAL CELLS FOR SMALL SIZED LIQUID CRYSTAL DISPLAY DEVICES

This application claims the benefit of Korean Patent Application No. 2000-71353, filed in Korea on Nov. 28, 2000, which is hereby incorporated by reference.

BACKGROUND OF THE INVENTION

1. Field of the Invention

The present invention relates to a liquid crystal display (LCD) device and more particularly, to a manufacturing process of liquid crystal cells for small sized liquid crystal display devices.

2. Discussion of the Related Art

A conventional liquid crystal display (LCD) panel has upper and lower substrates and a liquid crystal layer interposed therebetween. The upper substrate includes common electrodes, and the lower substrate includes switching elements, such as thin film transistors (TFTs), and pixel electrodes. The common electrodes and pixel electrodes are formed on upper and lower substrates, respectively, and a seal is formed on the lower substrate. The upper and lower substrates are then bonded together using a sealing material so that the common electrodes of the upper substrate and the pixel electrodes of the lower substrate come face to face with each other. A liquid crystal material is injected through injection holes of the seal into a gap formed between the upper and lower substrates through injection holes, and the injection holes are sealed. Polarizing films are attached to outer surfaces of the upper and lower substrates.

During operation of the liquid crystal panel, light passing through the liquid crystal panel is controlled by electric fields. The electric fields are applied by the pixel and common electrodes. By controlling the electric fields, image data (characters) are displayed on the liquid crystal panel.

Fabrication processes of various components of the liquid crystal display device, such as the thin film transistors and color filters, conventionally require numerous manufacturing steps. FIG. 1 is a flow chart illustrating a fabricating sequence of the liquid crystal cell for a conventional liquid crystal display device.

In FIG. 1, a first step ST1 involves cleaning the upper and lower substrates, commonly referred to as a color filter substrate and an array substrate, respectively. The first step ST1 removes impurities that may exist on the substrates and on one or more of the cells that have been previously formed on the upper and lower substrates.

In FIG. 1, a second step ST2 involves formation of alignment layers on the common and pixel electrodes previously formed on the upper and lower substrates, respectively. The second step ST2 also includes processes for coating, hardening, and rubbing of the alignment layers. A polyimide-based resin is conventionally selected for forming the alignment layers because it demonstrates excellent alignment characteristics with various liquid crystal materials. A surface of the hardened alignment layers is rubbed by a fabric to create surface scratches along a uniform direction. The rubbing process is necessary to form uniform alignment of the liquid crystal molecules in the liquid crystal layer, thereby ensuring uniform display. Accordingly, it is very important to uniformly form the alignment layers on a large surface of the common and pixel electrodes.

In FIG. 1, a third step ST3 involves printing a seal pattern and spacers on one, or both of the substrates. When the upper and lower substrates are attached, the seal pattern forms cell gaps between the upper and lower substrates that will receive the liquid crystal material. The seal pattern prevents the liquid crystal material from escaping out of the completed liquid crystal cell. A thermosetting resin that includes glass fibers, and a screen-print process are conventionally used to fabricate the seal pattern. The seal pattern includes an injection hole, and is formed along edge portions of a display area of each liquid crystal cell. After the seal pattern is printed, spacers are formed to maintain an accurate and uniform cell gap between the upper and lower substrates. Accordingly, the spacers must be formed on one, or both of the substrates with a uniform density. Presently, there are two processes for forming the spacers. A first process includes a wet dispensing method for spraying a mixture of alcohol and the spacers. A second process includes a dry dispensing method for spraying only the spacers.

In FIG. 1, a fourth step ST4 involves aligning and attaching the upper and lower substrates to each other. Accordingly, an aligning error margin in the fourth step ST4 is less than a few micrometers. If the upper and lower substrates are aligned and attached with an aligning margin larger than the aligning error margin less than a few micrometers, display quality of the display panel deteriorates due to leakage of light during operation of the liquid crystal cell.

In FIG. 1, a fifth step ST5 involves cutting the liquid crystal cell fabricated in the steps ST1–ST4 into individual liquid crystal cells. The cutting process includes a step of scribing the substrates to form cutting lines, and a step of severing the substrates along the scribed lines to form the individual liquid crystal cells.

In FIG. 1, a sixth step ST6 involves injecting the liquid crystal material into the individual liquid crystal cells. Since each individual liquid crystal cell has a gap ratio of only a few micrometers per hundreds of square centimeters in substrate surface area, a vacuum injection process utilizing a pressure difference is conventionally used for the liquid crystal cell. Since the vacuum injection process requires a significant amount of time in addition to the many other different fabrication processes for forming the liquid crystal display device, it is important to set an optimum condition for the vacuum injection process to increase fabrication yield. However, since there is no pressure difference between an interior of the liquid crystal cell and the liquid crystal material at the beginning of injection process, the liquid crystal material is injected by capillary action. When the liquid crystal material is injected into the liquid crystal cell, nitrogen gas or air is supplied to a vacuum chamber, thereby creating a pressure difference between the interior of the liquid crystal cell and an interior of the vacuum chamber. Accordingly, the liquid crystal material is injected into the liquid crystal cell as a result of the pressure difference. After the liquid crystal material is injected into the liquid crystal cell through an injection hole, the injection hole is sealed. The injection hole is conventionally sealed by forming an ultraviolet curable resin plug in the injection hole using a dispenser, and irradiating the plug with ultraviolet light to cure the resin and seal the hole. However, since the liquid crystal cell may become contaminated when exposed to air, the unsealed liquid crystal cell must be protected from the air and must not be allowed to be exposed to the air for a long period of time.

In FIG. 1, a seventh step ST7 involves inspecting the liquid crystal cell. A plurality of data lines and a plurality of gate lines of a unit cell are connected to a data pad and a gate pad, respectively, via shorting bars disposed in a marginal space of the liquid crystal cell. The marginal space includes a common voltage pad for applying a common voltage to the common electrode of the unit cell. The inspection is conducted by applying a voltage to the liquid crystal cell and observing an image displayed on the liquid crystal cell with a naked eye or with a microscope. In the inspection process, various qualities may be inspected. An existence of contaminates in the liquid crystal cell, point defects caused by the thin film transistors, line defects caused by discontinuities of the gate and data lines, and a optical defect properties caused by a differences of cell thickness, for example, may be inspected. Two inspection methods may be performed that include an ON-OFF inspection process, and an auto probe inspection process. The ON-OFF inspection process is performed by applying a direct current voltage using an ON-OFF apparatus and the auto probe inspection process is performed by applying an alternating current voltage using an auto probe apparatus.

In FIG. 1, an eighth step ST8 involves a grinding process. Static electricity that may have accumulated during the previous process steps is removed during the grinding process, and the shorting bars are cut away. Additional liquid crystal module processes may follow the grinding process.

FIG. 2 is a view showing an example of the ON-OFF inspection process of the liquid crystal cell for conventional small sized liquid crystal display devices. In general, the liquid crystal cell for small sized liquid crystal display devices is manufactured according to the processes of FIG. 1. In FIG. 2, a unit cell 10 is loaded onto the ON-OFF apparatus 20, which is sized for the unit cell 10. A plurality of pads 14 for inspection are formed in a marginal space of the unit cell 10. A voltage is applied to the unit cell 10 through the pads 14, thereby displaying an image, and an inspection process is performed. However, the ON-OFF inspection process based on a unit cell is problematic. First, when a 370 mm×470 mm glass substrate is used, a total of about 64 50 mm×50 mm unit cells can be obtained. If each of the 64 unit cells are individually inspected on the ON-OFF apparatus, a significant amount of time is required due to handling of the small sized unit cell. Furthermore, since each of the unit cells needs to be inspected individually, Turn Around Time (TAT) for each unit cell is increased, thereby decreasing resulting in low productivity.

SUMMARY OF THE INVENTION

Accordingly, the present invention is directed to a manufacturing method of liquid crystal cells for small sized liquid crystal display devices that substantially obviates one or more of problems due to limitations and disadvantages of the related art.

An object of the present invention is to provide an inspection method of liquid crystal cells for small sized liquid crystal display devices for reducing inspection process time.

Another object of the present invention is to provide an inspection method of liquid crystal cells for small sized liquid crystal display devices to improve handling of the liquid crystal cells.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of liquid crystal cells for a liquid crystal display device includes forming a first plurality of liquid crystal cells that include a color filter and a common electrode on an upper substrate, forming a second plurality of liquid crystal cells that include a plurality of gate lines and a plurality of data lines on a lower substrate, forming a gate contact pad in a marginal space of the lower substrate, the gate pad connected to a first group of the plurality of gate lines of one of a common row and common column of the second plurality of cells, forming a data contact pad in the marginal space of the lower substrate, the data pad connected to a first group of the plurality of data lines of one of a common row and common column of the second plurality of cells, forming a common voltage contact pad on the lower substrate for applying a common voltage to the common electrode on the upper substrate, forming an assembled substrate by bonding the lower substrate to the upper substrate, separating the assembled substrate into sub-substrates that include at least the second plurality of liquid crystal cells arranged in the one of a common row and common column, introducing liquid crystal material into the liquid crystal cells of the sub-substrate, and inspecting the liquid crystal cells of the sub-substrate by applying a voltage to the gate contact pad, the data contact pad and the common voltage contact pad.

In another aspect, a liquid crystal display device includes upper and lower substrates, a first plurality of liquid crystal cells including a color filter and a common electrode on the upper substrate, a second plurality of liquid crystal cells including a plurality of gate lines and a plurality of data lines on the lower substrate, a gate contact pad in a marginal space of the lower substrate, the gate pad connected to a first group of the plurality of gate lines of one of a common row and common column of the second plurality of cells, a data contact pad in the marginal space of the lower substrate, the data pad connected to a first group of the plurality of data lines of one of a common row and common column of the second plurality of cells, and a common voltage contact pad on the lower substrate for applying a common voltage to the common electrode on the upper substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, which is illustrated in the accompanying drawings.

Figure 4:
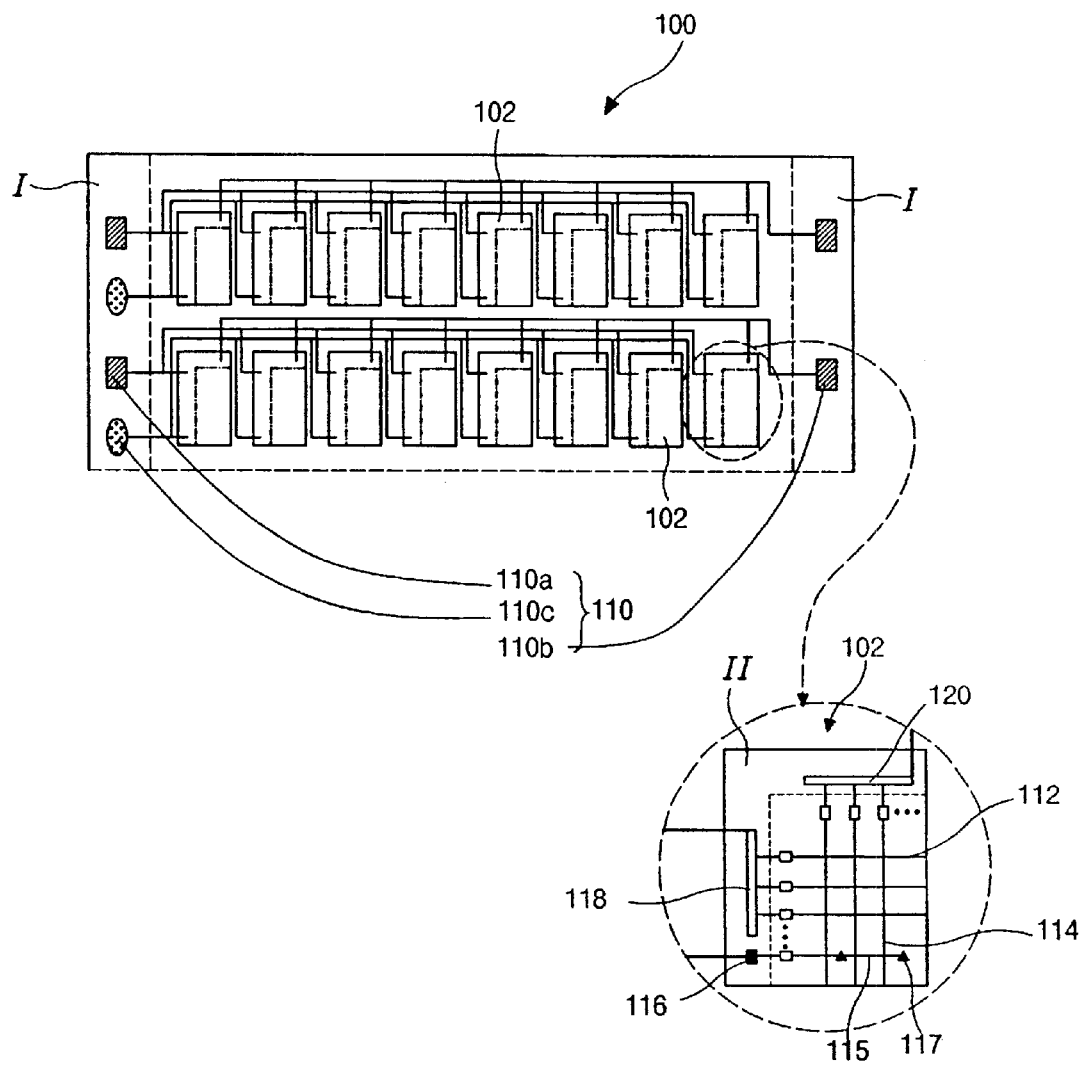
FIG. 4 is a plan view illustrating a portion of an exemplary lower substrate for a small sized liquid crystal display device according to the present invention.

FIG. 4 is a plan view illustrating a portion of an exemplary lower substrate for a small sized liquid crystal display device according to the present invention. In FIG. 4, a plurality of liquid crystal cells 102 including a plurality of gate lines and a plurality of data lines may be formed on a lower substrate 100. A plurality of contact pads 110 may be formed on marginal spaces I of the lower substrate 100 where the liquid crystal cells are not to be formed. The plurality of contact pads 110 electrically connect all the liquid crystal cells 102 in a common row. Alternatively, the plurality of contact pads may electrically connect all the liquid crystal cells in a common column. The contact pads 110 may include a gate contact pad 110a, a data contact pad 110b, and a common voltage contact pad 110c for applying a common voltage to common electrodes on an upper substrate.

In the exploded view of FIG. 4, a plurality of gate lines 112 and a plurality of data lines 114 cross each other in the liquid crystal cell 102, shorting bars 118 and 120 are formed in marginal spaces II for grouping the gate and data lines, respectively, and a sub-pad 116 applies a common voltage to the upper substrate. The lower substrate may further include pads connecting liquid crystal cells in a common row or common column to simultaneously inspect common rows or common columns of the liquid crystal cells. The connecting structure between the pads and liquid crystal cells may include different configurations, and the position of the pads may be reconfigured. For example, the plurality of gate lines 112 may be connected to the shorting bar 118 on the marginal space II of unit cell 102, and the plurality of data lines 114 may be connected to the shorting bar 120 on the marginal space II of unit cell 102. A common line 115 may be connected to the sub-pad 116, and dots 117 of silver, for example, may be formed on the common line 115 for electrically contacting the upper and lower substrates. In addition, shorting bars in a common row or common column of the lower substrate may be respectively connected to the gate pad 110a and the data pad 110b on the marginal space I of the lower substrate 100. The sub-pads in a common row or common column of the lower substrate 100 may be connected to the common voltage pad 110c on the marginal space I of the lower substrate 100.

If a gate signal is applied to the gate pad 110a, a medium level gray signal, for example, may be applied to the data pad 110b a common signal may be applied to the common voltage pad 110c, and a plurality of unit cells in a common row or common column of the lower substrate 100 may be simultaneously inspected during the ON-OFF inspection process, or during the auto probe inspection process.

Figure 5A:
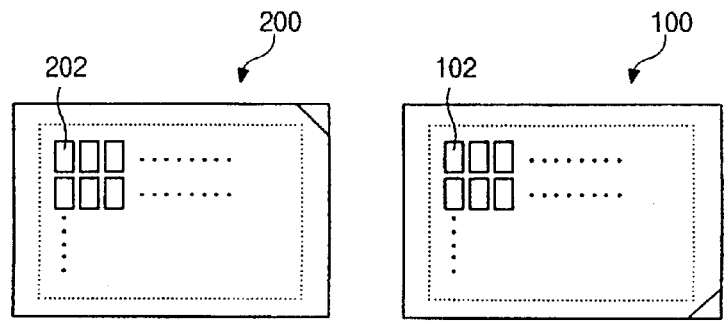
FIGS. 5A to 5E are views illustrating an exemplary manufacturing process of a liquid crystal cell for small sized liquid crystal display devices according to the present invention.

FIGS. 5A to 5E are views illustrating an exemplary manufacturing process of the liquid crystal cells for small sized liquid crystal display devices according to the present invention. In FIG. 5A, alignment layers (not shown) may be formed on an upper substrate 200 and a lower substrate 100 as shown in a first step ST1 and a second step ST2 of FIG. 3. In the first step ST1 of FIG. 3, the upper and lower substrates 200 and 100, i.e., a color filter substrate and an array substrate, respectively, may be cleaned. In the second step ST2 of FIG. 3, alignment layers may be formed on common electrodes and pixel electrodes of the upper and lower substrates 200 and 100, respectively, and coating, hardening, and rubbing processes for the alignment layers may be performed. A polyimide-based resin may be selected for an alignment layer material because it demonstrates superior alignment characteristics with various liquid crystal materials. A surface of the hardened alignment layers may be rubbed by a fabric to create scratches along a uniform direction of the alignment layers.

Figure 3:
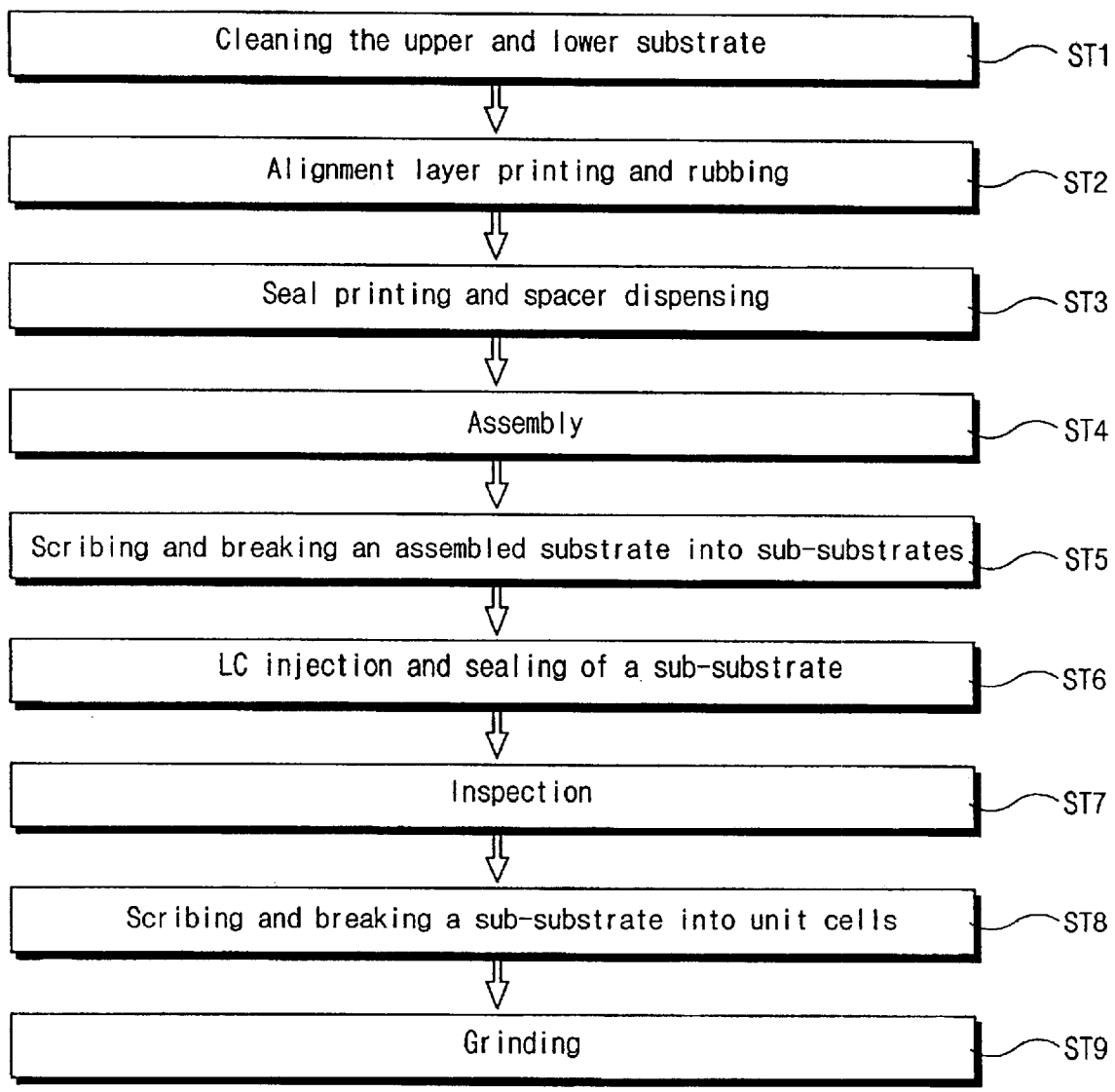
FIG. 3 is a flow chart illustrating an exemplary fabrication process of liquid crystal cells for a liquid crystal display device according to the present invention.
Figure 5B:
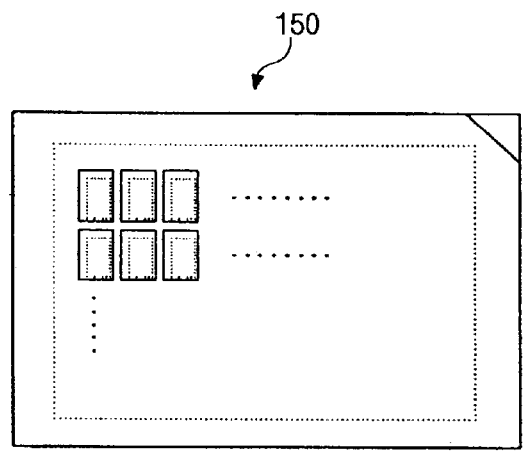

In FIG. 5B, seal patterns (not shown) may be printed, for example, on each unit cell formed on the lower substrate 100 after forming the alignment layers as shown in step 3 ST3 of FIG. 3. Then, the upper substrate 200 and the lower substrate 100 may be assembled according to step 4 ST4 of FIG. 3 to form a bonded structure 150. The seal patterns form cell gaps within the bonded structure 150, whereby the cell gaps will receive the liquid crystal material. The seal patterns may be formed along internal edges of the unit cells, thereby leaving open injection holes (not shown). The position of the injection holes may depend on the position of the pads formed on the lower substrate 100. Since the bonded structure 150 is to be cut, and the liquid crystal material is to be injected, if the injection holes are formed in a horizontal position with the pads, the inspection process becomes unattainable.

A thermosetting resin that includes a glass fiber, and a screen-print process may be used to fabricate the seal patterns. After the seal patterns are printed, spacers (not shown) may be formed to maintain accurate and uniform cell gaps between the upper and lower substrates 200 and 100. Accordingly, the spacers must be formed on one, or both of the upper and lower substrates 200 and 100 with a uniform density.

Figure 1:
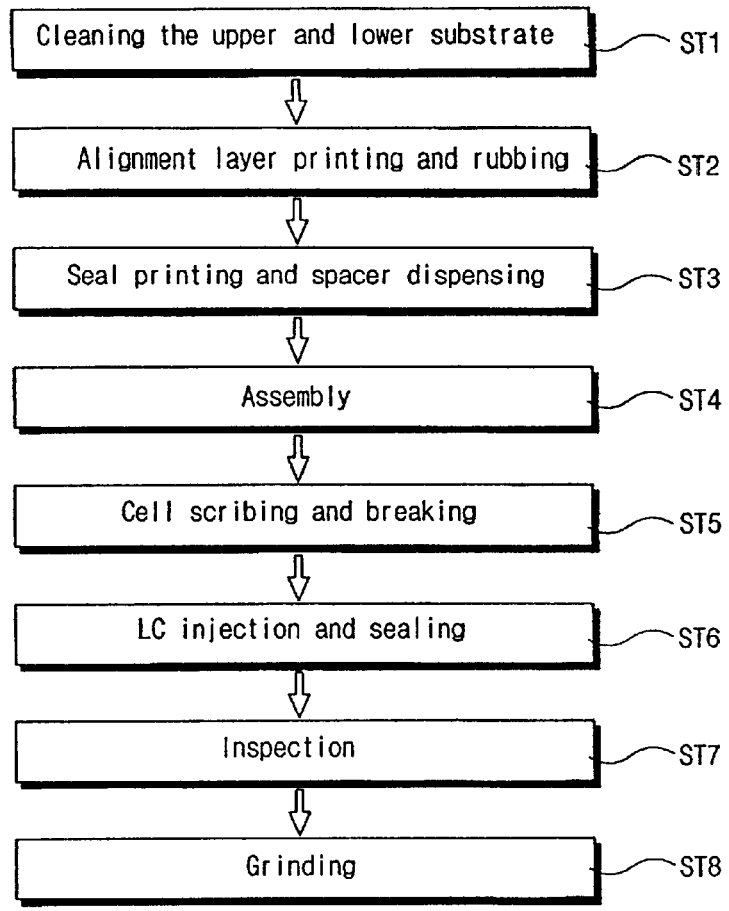
FIG. 1 is a flow chart illustrating a fabrication process of liquid crystal cells for a liquid crystal display device according to the related art.
Figure 2:
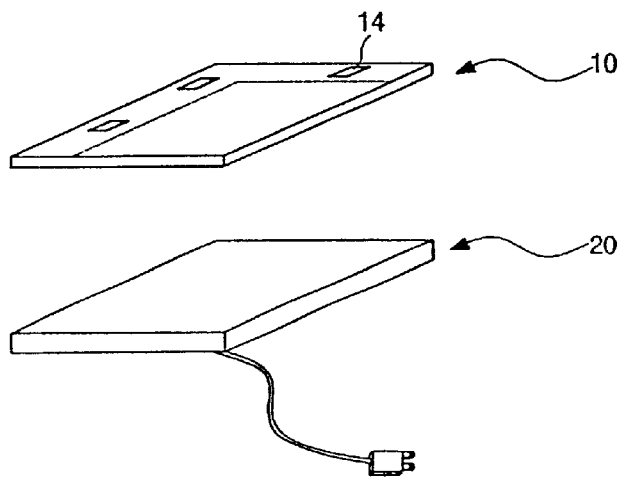
FIG. 2 shows an example of an ON-OFF inspection process of a liquid crystal cell according to the related art.
Figure 5C:
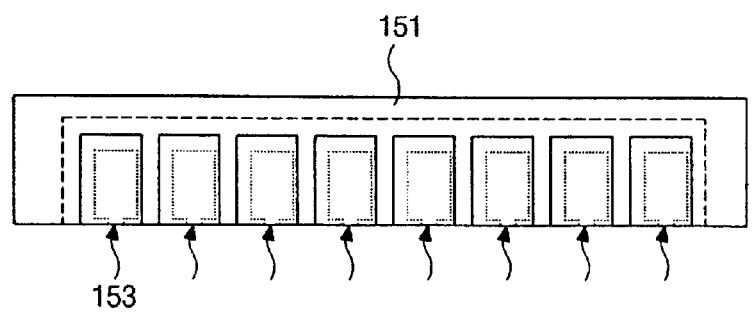

In FIG. 5C, the bonded structure 150 (in FIG. 5B) may be cut into sub-substrates 151 to include a plurality of liquid crystal cells in a common row or common column as shown according to step 5 ST5 of FIG. 3. Then, the liquid crystal material may be injected into the sub-substrate 151 in a vacuum chamber according to step 6 ST6 of FIG. 3. As shown in FIG. 5C, the bonded structure 150 (in FIG. 5B) may be cut into sub-substrates 151 to expose injection holes 153 to ambient air. That is, the liquid crystal injection and sealing processes may be simultaneously performed for the plurality of liquid crystal cells, as shown by the arrows. The liquid crystal injection process may be similar to step 6 ST6 of FIG. 1 except that the injection process is performed on the sub-substrates 151. After the liquid crystal material is injected into the individual liquid crystal cells of the sub-substrates 151, the injection holes 153 may be sealed. The injection holes may be sealed by forming ultraviolet curable resin plugs (not shown) in the injection holes 153 using a dispenser, and irradiating the plugs with ultraviolet light, thereby curing the ultraviolet resin and sealing the injection holes 153.

Figure 5D:
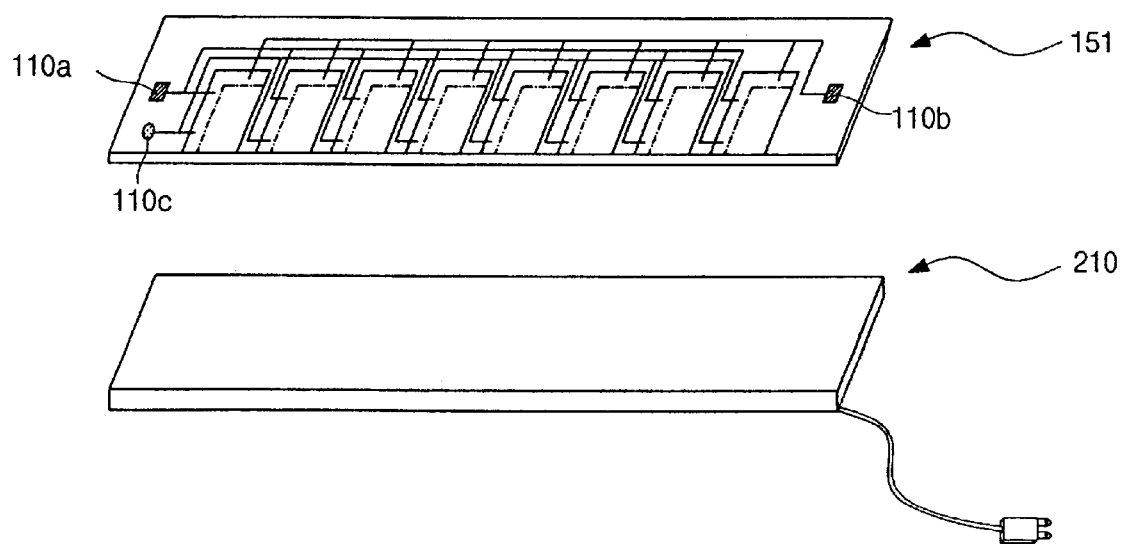

In FIG. 5D, ON-OFF inspection processes of the liquid crystal cells may be performed on the sub-substrates 151 according to step 7 ST7 of FIG. 3. Prior to beginning the ON-OFF inspection processes, a portion of the upper substrate 200 (in FIG. 5A) of the sub-substrate 151 may be removed to expose the pads formed on the lower substrate 100 (in FIG. 5A). The sub-substrate 151 is loaded onto an ON-OFF apparatus 210 that accommodates the sub-substrate 151. Each of the sub-substrates 151 are subsequently inspected using an electric ON-OFF procedure, and a displayed image procedure of the liquid crystal cells by simultaneously applying a voltage to all the liquid cells on the sub-substrate 151 through a gate contact pad 110a, a data contact pad 110b, and a common voltage contact pad 110c. Accordingly, the plurality of liquid crystal cells included in the sub-substrate 151 are simultaneously inspected. The inspection process is performed by applying a voltage to the gate contact pad 110a, the data contact pad 110b, and the common voltage contact pad 110c using the ON-OFF apparatus 210, and observing displayed images of each of the liquid crystal cells with a naked eye or with a microscope. For example, if a 370 mm×470 mm glass substrate is produced, and 50 mm×50 mm liquid crystal cells are manufactured from the glass substrate, a Turn Around Time (TAT) for inspection processing can be decreased by about one-eighth of the time required for the conventional inspection method. Furthermore, the ON-OFF inspection process where a direct current voltage is applied using the ON-OFF apparatus or an auto probe inspection process where an alternating current voltage is applied using an auto probe apparatus may be selectively used in the present invention.

Figure 5E:
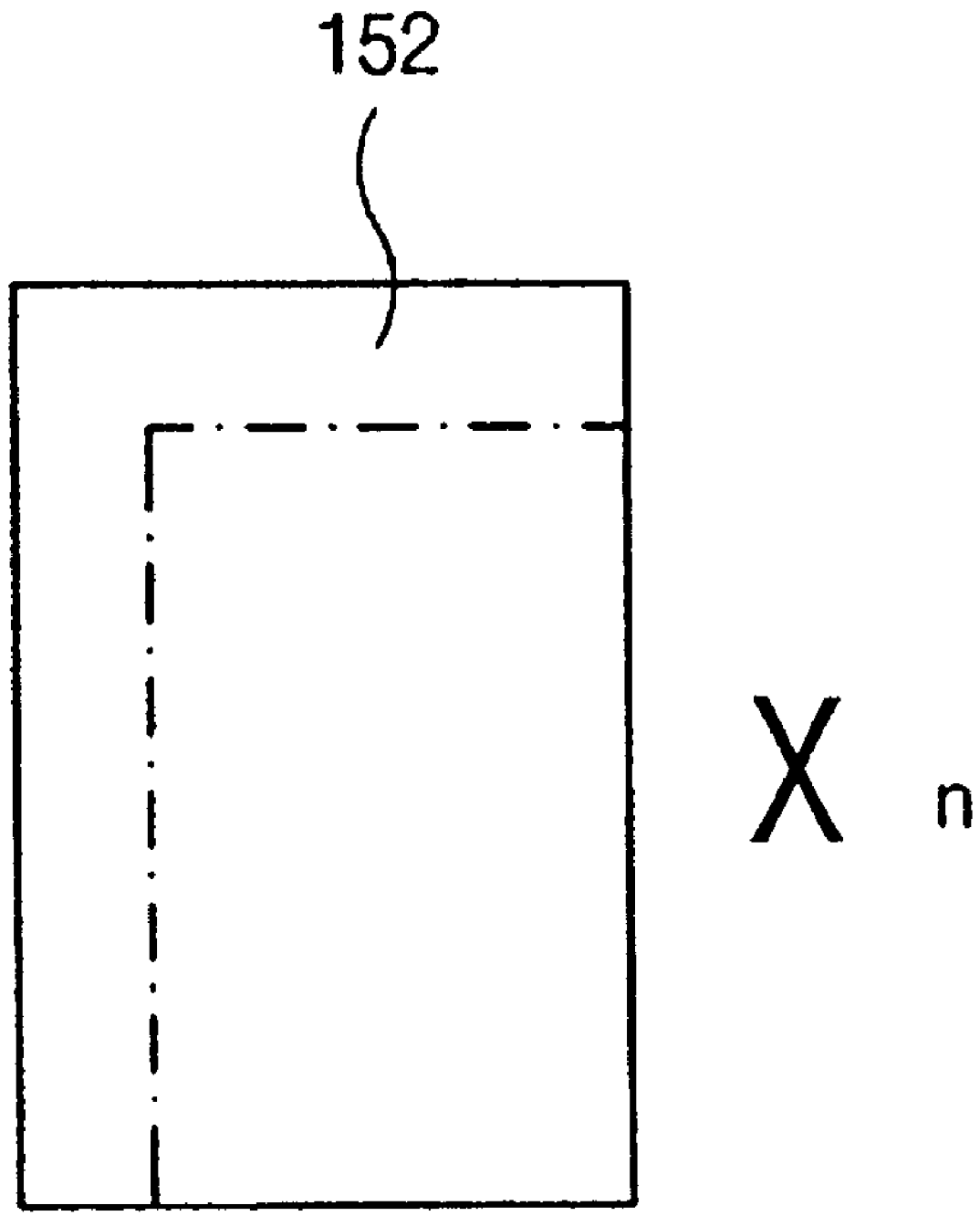

In FIG. 5E, the sub-substrate 151 (in FIG. 5D) may be cut into unit cells after the inspection process according to step 8 ST8 of FIG. 3. Shorting bars (not shown) of the unit cells are removed during cutting, and a grinding process may be follow, i.e., scribing and breaking processes according to step 9 ST9 of FIG. 3. Finally, quality inspection processes may be performed to ensure production quality.

It will be apparent to those skilled in the art that various modifications and variation can be made in the manufacturing process of liquid crystal cells for small sized liquid crystal display devices of the present invention without departing from the spirit or scope of the invention. Thus, it is intended that the present invention cover the modifications and variations of this invention provided they come within the scope of the appended claims and their equivalents.

What is claimed is:

1. A manufacturing method of liquid crystal cells for a liquid crystal display device, comprising:

forming a first plurality of liquid crystal cells that include a color filter and a common electrode on an upper substrate;

forming a second plurality of liquid crystal cells that include a plurality of gate lines and a plurality of data lines on a lower substrate;

forming a gate contact pad in a marginal space of the lower substrate, the gate pad connected to a first group of the plurality of gate lines of one of a common row and common column of the second plurality of cells;

forming a data contact pad in the marginal space of the lower substrate, the data pad connected to a first group of the plurality of data lines of the one of a common row and common column of the second plurality of cells;

forming a common voltage contact pad on the lower substrate for applying a common voltage to the common electrodes on the upper substrate;

forming an assembled substrate by bonding the lower substrate to the upper substrate;

separating the assembled substrate into sub-substrates that include at least the second plurality of liquid crystal cells arranged in the one of a common row and common column;

introducing liquid crystal material into the liquid crystal cells of the sub-substrate; and inspecting the liquid crystal cells of the sub-substrate by applying a voltage to the gate contact pad, the data contact pad and the common voltage contact pad.

2. The method according to claim 1, wherein a size of each of the liquid crystal cells is about 50 mm×50 mm.

3. The method according to claim 2, further includes cutting the sub-substrate into unit cells after the inspecting, and grinding edges of the unit cells to remove shorting bars.

4. The method according to claim 1, wherein the inspecting of the liquid crystal cells includes an ON-OFF inspection process using an ON-OFF apparatus for applying the voltage to the gate contact pad, the data contact pad and the common voltage contact pad.

5. The method according to claim 4, further includes cutting the sub-substrate into unit cells after the ON-OFF inspection process, and grinding edges of the unit cells to remove shorting bars.

6. The method according to claim 1, wherein the inspecting of the liquid crystal cells includes applying the voltage to the gate contact pad, the data contact pad and the common voltage contact pad.

7. The method according to claim 6, further includes cutting the sub-substrate into unit cells after the auto probe inspection process, and grinding edges of the unit cells to remove shorting bars.

8. The method according to claim 1, wherein the plurality of gate lines are connected to first plurality of shorting bars and the plurality of data lines are connected to a second plurality of shorting bars.

9. The method according to claim 8, wherein the first plurality of shorting bars are connected to the gate pad and the second plurality of shorting bars are connected to the data pad, the first and second pluralities of shorting bars are within the marginal space of the lower substrate.

10. The method according to claim 1, wherein the introducing is carried out by injection using a vacuum chamber.

11. The method according to claim 1, wherein a marginal space of the upper substrate is removed to expose the pads of the lower substrate before the inspecting.

12. A liquid crystal display device, comprising:

upper and lower substrates;

a first plurality of liquid crystal cells including a color filter and a common electrode on the upper substrate;

a second plurality of liquid crystal cells including a plurality of gate lines and a plurality of data lines on the lower substrate;

a gate contact pad in a marginal space of the lower substrate, the gate pad connected to a first group of the plurality of gate lines of one of a common row and common column of the second plurality of cells;

a data contact pad in the marginal space of the lower substrate, the data pad connected to a first group of the plurality of data lines of one of a common row and common column of the second plurality of cells; and a common voltage contact pad on the lower substrate for applying a common voltage to the common electrodes on the upper substrate, wherein the plurality of gate lines are electrically connected to a first plurality of shorting bars and the plurality of data lines are electrically connected to a second plurality of shorting bars.

13. The device according to claim 12, wherein a size of each of the liquid crystal cells of the second plurality of liquid crystal cells is about 50 mm×50 mm.

14. The device according to claim 12, wherein the first plurality of shorting bars are electrically connected to the gate pad and the second plurality of shorting bars are electrically connected to the data pad, the first and second pluralities of shorting bars are within the marginal space of the lower substrate.

* * * * *